United States Patent [19]

Ferrari

[11] Patent Number: 4,792,080

[45] Date of Patent: Dec. 20, 1988

[54] APPARATUS FOR REBUILDING VEHICLE AXLES

[76] Inventor: William J. Ferrari, 1315 Washington Blvd., Pittsburgh, Pa. 15068

[21] Appl. No.: 879,602

[22] Filed: Jun. 27, 1986

[51] Int. Cl.$^4$ .................... B23P 7/00; B23K 31/00
[52] U.S. Cl. .................... 228/49.3; 29/402.08; 301/131
[58] Field of Search ............ 228/49.3, 44.5, 49.1, 228/119; 269/43; 301/130, 131; 29/402.08, 402.13, 402.16

[56] References Cited

U.S. PATENT DOCUMENTS

| 60,876 | 1/1867 | Gillett | 301/131 |
|---|---|---|---|
| 96,043 | 10/1869 | Smith | 301/131 |
| 101,586 | 4/1870 | Cluxton | 301/131 |
| 519,732 | 5/1894 | Palmer | 301/131 |
| 822,298 | 6/1906 | Nickerson | 301/131 |
| 900,562 | 10/1908 | Martin | 301/131 |
| 3,529,339 | 9/1970 | Taurignan | 29/402.08 X |
| 3,915,504 | 10/1975 | Bauer | 301/130 |
| 4,467,955 | 8/1984 | Maupin, Jr. | 228/49.3 X |

FOREIGN PATENT DOCUMENTS 3448 2/1969 Japan.
68196 4/1985 Japan.

Primary Examiner—Nicholas P. Godici
Assistant Examiner—Carmine Cuda

[57] ABSTRACT

A method in which a jig is used to position a replacement for a removed end-adjacent portion of an axle. The replacement is then welded to the remainder of the axle. A replacement part, a jig, and a kit facilitating the repair method are provided.

8 Claims, 2 Drawing Sheets

APPARATUS FOR REBUILDING VEHICLE AXLES

DESCRIPTION

1. Technical Field

The invention relates generally to axle repair methods and apparatus and more specifically to method and apparatus for repairing vehicle axles at the failure site.

2. Background

U.S. Pat. No. 4,455,732 of Leo C. Shiets provides an introduction to the subject of axle repair, and particularly such repair in the case of long-haul trucks at the site of failure. The particular repair technique of Shiets involves boring a seat for a replacement terminal portion of an axle, inserting the replacement in the seat, and welding for securing the replacement in position in the seat.

Besides the technique shown by Shiets, it is also known to make a welded jig to temporarily hold a replacement terminal portion in place with respect to the remainder of an axle, until the terminal portion has been partially welded to the remainder of the axle at the joint between them. This welded jig is composed of two inner bearing races held together by four struts welded between them. The races are of size appropriate for fitting on the inner and outer bearing surfaces of the axle. The terminal portion is initially welded to the remainder of the axle through the access to the joint provided by the spaces between the struts. The jig is then removed and the finish welding done. This technique has never been very satisfactory, because, even when manufactured with the races in place on a good axle, there is always distortion and non-alignment of the races with respect to one another caused by the process of welding the struts to the races. This necessitates, for example, having to force the jig during placement and removal.

DISCLOSURE OF INVENTION

It is an object of the invention to provide improved method and apparatus for axle repair.

This as well as other objects which will become apparent in the discussion that follows, are archieved according to the present invention by a novel jig positioning of a replacement for a removed end-adjacent portion of an axle, followed by welding of the replacement to the remainder of the axle. A replacement part, a jig, and a kit facilitating the repair method are provided.

MODES OF CARRYING OUT THE INVENTION

One method for rebuilding vehicle axles according to the invention is illustrated in FIGS. 1 to 4.

Figure 1:
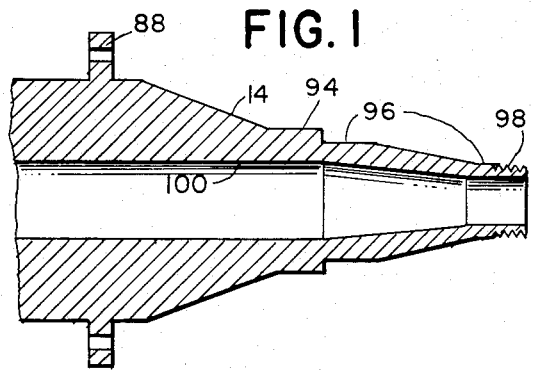
FIG. 1 is a full sectional view of the terminal portion of a damaged vehicle axle and corresponds to FIG. 4 in the above-referenced U.S. Pat. No. 4,455,732.
Figure 4:
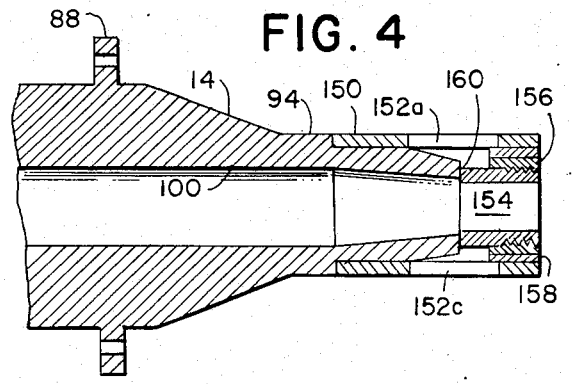
FIG. 4 is a view as in FIG. 3, however with the addition of a replacement for the removed portion.

FIG. 1 corresponds to FIG. 4 in U.S. Pat. No. 4,455,732 and shows a terminal portion of an axle 14 including a spider flange 88, an oil seal surface 94, and on a spindle a pair of coaxial but axially spaced apart bearing surfaces 96 and a threaded portion 98 adjacent the terminus of the axle 14. The axle 14 also defines a central passageway 100 through which a drive shaft (not illustrated) extends.

Although both of surfaces 96 can fail, the usual case (about 80% of failures) is that the outer bearing surface 96, i.e. that nearest the threaded portion 98, has failed, while the inner bearing surface 96, i.e. that adjacent the oil seal surface 94, is still good. Threaded portion 98 may also be damaged.

Figure 2:
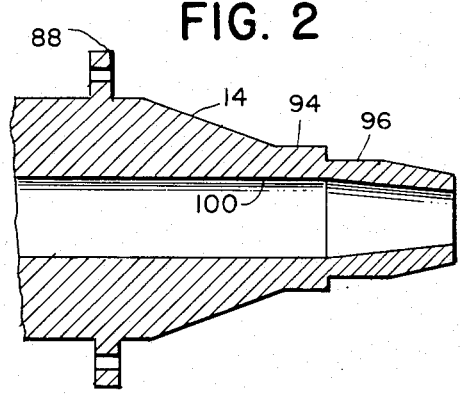
FIG. 2 is a view as in FIG. 1, however with the damaged end-adjacent portion removed.

In a first step for rebuilding an axle according to a method illustrating the invention, the axle 14 is cut by conventional techniques, such as a saw, between the two bearing surfaces 96, such that the damaged outer bearing surface and the threaded portion 98 are removed. The remainder of the end of axle 14 following removal of the end-adjacent portion is shown in FIG. 2.

Figure 3:
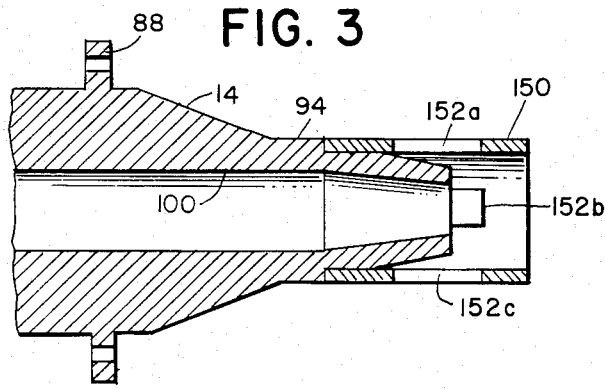
FIG. 3 is a view as in FIG. 2, however with the addition of a jig according to the invention.

In FIG. 3, a jig 150 according to the invention has been put in place. The jig 150, which is made from a piece of aluminum or steel tube or pipe, has a cylindrical internal surface such that it can slide onto the inner bearing surface 96, whereupon the jig will be coaxial with the bearing surface. Jig 150 has four equally-sized rectangular windows, of which three, 152a, b, and c, are shown in FIG. 3. Unlike the above-described jig assembled by the welding together of separate bearing races and struts, jig 150 has a unitary construction in that it is formed from one piece of cylindrical pipe, machined and cut as required to provide the cylindrical internal surface and windows. It is thus a non-welded construction. This unitary construction eliminates the problem of distortion in the above-described, welded jig.

FIG. 4 shows a replacement end-adjacent portion 154 in position against the remaining portion of axle 14. Replacement 154 is likewise in coaxial position, this being effected by bushings 156, 158, in the form of cylindrical rings cut and machined from tube stock. Jig 150 and replacement 154 can be held in place by axially directed pushing by hand or by an end plate (not shown) in the form of a washer tightened by a nut on a shank secured internally in passageway 100. Suitable means are shown in U.S. Pat. No. 3,324,701. With respect to FIG. 1 of that patent, internal securement is obtained by removing guard 21, inserting the end bearing cam member 13, segments 17, into passageway 100 of the present drawings, and rotating handle 11 to obtain securement. Handle 11 forms the shank, which is externally threaded on the right side in FIG. 1 of U.S. Pat. No. 3,324,701, for receiving the tightening nut.

In the case of the solid axles used in trailers, the replacement is held in abutment with the remainder of the axle manually. An external clamp may also be designed for this purpose.

In either case, hollow drive axles or solid trailer axles, the fit of the jig and bushings may be tight enough that even manual holding of the jig and replacement are unnecessary.

It is to be noted that replacement 154 is cylindrical, and has no conical portion corresponding to the conical portion that was removed from the axle. The result is that a welding-supportive notch 160 is formed where the replacement contacts the remainder of the axle. Notch 160 can be made deeper by appropriate chamfering of the end of the replacement 154.

Unlike the previous practice of cutting replacements from the axles of junked vehicles, replacement 154 is a separately manufactured product.

The replacement 154 is next welded to the remainder of the axle through windows 152. In general, there will be enough of a gap between the jig and the joint that a root pass can be placed through the windows through a complete 360 degrees. The root pass can be deposited in a distortion-limiting sequence of, with reference to a 12-hour clock, 6 to 3, 9 to 12, 6 to 9, and 3 to 12. This is followed by removal of jig 150 and bushings 156, 158 from the axle. The replacement, thus stitch welded, may then be finished-welded in position.

The replaced bearing surface 96 may then be ground for finishing, using apparatus as shown in U.S. Pat. No. 4,098,029 of Leo C. Shiets.

Figure 5:
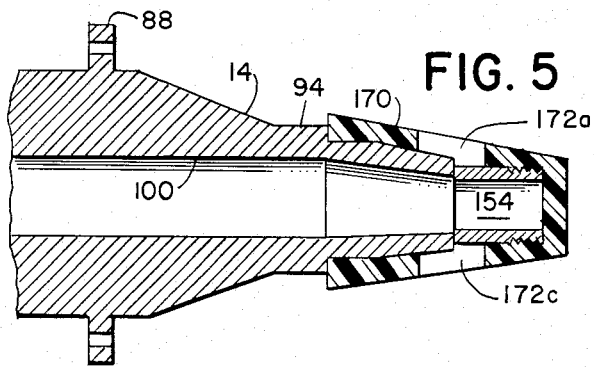
FIG. 5 is a view as in FIG. 4, of an alternate embodiment of the invention.

FIG. 5 illustrates an alternate embodiment of the invention. Here, a jig 170 made of molded plastic, for instance a cast Nylon plastic, has been placed in position on an axle remainder as shown in FIG. 2. Appropriately sized internal cylindrical surfaces are provided by the molding process. This jig has an interference fit with the inner bearing surface and may be hammered into position with a heavy, rubber-headed mallet to provide a sufficiently tight position of replacement 154 against the remainder of axle 14 that no extra means (whether hands or a tool based on that of U.S. Pat. No. 3,324,701) need be provided to hold the jig and replacement in abutment against the axle remainder. Tack-welding is accomplished through windows 172, analogously as in the embodiment of FIG. 4. It will be observed that this embodiment using a jig which has been molded is another way to obtain a unitary construction overcoming the distortion problem burdening the above-mentioned strut-race jig.

The apparatus used in conjunction with the embodiment of FIG. 4 and that for FIG. 5 are amenable to provision in kit form. A kit for the embodiment of FIG. 4 would comprise (1) a jig 150, (2) a selection of differently sized bushings 156, 158, etc., for enabling the jig to serve for a variety of sizes of both inner and outer bearing surface, and, optionally, (3) one or more replacements 154. Unlike the strut-race jig, which always was made to fit just a certain axle spindle in that the appropriately dimensioned inner bearing races for the inner and outer bearing surfaces were joined by the struts (thus requiring the carrying of perhaps 24 different jigs if a welder were to be prepared for every possible job), the kit of this embodiment can fit many different axle spindles by appropriate use of the differently sized bushings.

The embodiment of FIG. 5 is especially suited for the provision of kits exactly manufactured for given trucks. Appropriate kits for a truck may be carried with the truck or may be warehoused by a trucking company for the trucks in its fleet. The kit would comprise (1) a jig 170 and (2) a replacement 154. The replacement may be pre-seated in the jig, so that the welder need only slide the jig onto the inner bearing surface and begin welding.

I claim:

1. A jig for use in replacing an outer bearing surface in a vehicle axle having on a spindle a pair of coaxial, axially spaced apart bearing surfaces, one of the pair being an inner bearing surface and the other the outer bearing surface, the jig comprising, a unitary one piece substantially cylindrical member having at one end an internal cylindrical surface means sized to slidably fit onto said inner bearing surface, the other end of the jig having an internal cylindrical surface means for supporting and aligning an outer bearing surface replacement part to be welded to the axle, and windows in the cylindrical member opening on the spacing between the bearing surfaces providing external access means for welding the outer bearing surface replacement part to the axle.

2. The jig of claim 1 wherein at least one of said internal cylindrical surface means comprises at least one bushing means.

3. The jig of claim 1 wherein said jig is a plastic jig.

4. A kit for use in replacing an outer bearing surface in a vehicle axle having on a spindle a pair of coaxial, axially spaced apart bearing surfaces, one of the pair being an inner bearing surface and the other the outer bearing surface, the kit comprising an outer bearing surface replacement part and a
   jig comprising, a unitary one piece substantially cylindrical member having at one end an internal cylindrical surface means sized to slidably fit onto said inner bearing surface, the other end of the jig having an internal cylindrical surface means for supporting and aligning said outer bearing surface replacement part to be welded to the axle, and windows in the cylindrical member opening on the spacing between the bearing surfaces providing external access means for welding the outer bearing surface replacement part to the axle.

5. The kit of claim 4 wherein said outer bearing surface replacement part is cylindrical, there being a welding-supportive notch (160) at contact of the replacement part to a remainder of the axle.

6. A kit for use in replacing an outer bearing surface in a vehicle axle having on a spindle a pair of coaxial, axially spaced apart bearing surfaces, one of the pair being an inner bearing surface and the other the outer bearing surface, the kit comprising at least one replacement part for only the axle outer bearing surface and a jig comprising, a unitary one piece substantially cylindrical member having at one end an internal cylindrical surface means sized to slidably fit onto said inner bearing surface, the other end of the jig having an internal cylindrical surface means for supporting and aligning a selected one of said at least one outer bearing surface replacement part to be welded to the axle, and windows in the cylindrical member opening on the spacing between the bearing surfaces providing external access means for welding the outer bearing surface replacement part to the axle.

7. The kit of claim 6 further comprising at least one sized bushing means for enabling the jig to serve for a variety of sizes of both outer bearing surface replacement parts and inner bearing surfaces.

8. A kit for use in replacing an outer bearing surface in a vehicle axle having on a spindle a pair of coaxial, axially spaced apart bearing surfaces, one of the pair being an inner bearing surface and the other the outer bearing surface, the kit comprising (1) a jig comprising, a unitary one piece substantially cylindrical member having at one end an internal cylindrical surface means sized to slidably fit onto said inner bearing surface, the other end of the jig having an internal cylindrical surface means for supporting and aligning an outer bearing surface replacement part to be welded to the axle, and windows in the cylindrical member opening on the spacing between the bearing surfaces providing external access means for welding the outer bearing surface replacement part to the axle and (2) at least two sized bushing means for enabling the jig to serve for a variety of sizes of both outer bearing surface replacement parts and inner bearing surfaces.

* * * * *